(12) United States Patent
Sasaki et al.

(10) Patent No.: US 12,054,130 B2
(45) Date of Patent: Aug. 6, 2024

(54) VEHICLE BRAKE SYSTEM

(71) Applicant: Robert Bosch GmbH, Stuttgart (DE)

(72) Inventors: Junichi Sasaki, Kanagawa (JP);
Kazuaki Kevin Tamura, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 17/788,484

(22) PCT Filed: Nov. 19, 2020

(86) PCT No.: PCT/IB2020/060906
§ 371 (c)(1),
(2) Date: Jun. 23, 2022

(87) PCT Pub. No.: WO2021/130568
PCT Pub. Date: Jul. 1, 2021

(65) Prior Publication Data
US 2023/0034103 A1    Feb. 2, 2023

(30) Foreign Application Priority Data

Dec. 23, 2019  (JP) ................. 2019-231139

(51) Int. Cl.
*B60T 13/66*  (2006.01)
*B60T 7/22*   (2006.01)
(Continued)

(52) U.S. Cl.
CPC ............. *B60T 13/662* (2013.01); *B60T 7/22* (2013.01); *B60T 8/3265* (2013.01);
(Continued)

(58) Field of Classification Search
CPC .... B60T 13/662; B60T 13/146; B60T 13/686; B60T 7/22; B60T 7/042; B60T 8/3265;
(Continued)

(56) References Cited

U.S. PATENT DOCUMENTS 7,260,464 B2 *  8/2007  Fujinami ................. B60T 7/22
                                            701/70
9,944,259 B2    4/2018  Bunk
(Continued)

FOREIGN PATENT DOCUMENTS

JP        2018097582 A      6/2018

OTHER PUBLICATIONS

International Search Report and Written Opinion for Application No. PCT/IB2020/060906 dated Feb. 16, 2021 (9 pages).

*Primary Examiner* — Hai H Huynh
(74) *Attorney, Agent, or Firm* — Michael Best & Friedrich LLP

(57) ABSTRACT

[Problem] The present invention provides a vehicle brake system capable of shortening a delay time from time at which an execution request of a pre-crash brake executed by actuation of an electric booster is sent to time at which the pre-crash brake is actually actuated.

[Means for Resolution] In a vehicle brake system (1) including: a hydraulic unit (20); a braking control section (90) for controlling the hydraulic unit (20); a master cylinder (14); an electric booster (10); a booster control section (100) for controlling the electric booster (10); and a pre-crash brake execution determination section (110), the pre-crash brake execution determination section (110) sends information on a specified target value (P_tgt) for decelerating a vehicle to the booster control section (100) and the braking control section (90). When a change amount (ΔP) of the target value (P_tgt) received from the pre-crash brake execution determination section (110) exceeds a specified threshold value (ΔP_thr), the booster control section (100) drives the electric booster (10) prior to a command from the braking control (Continued)

section (90) and executes preceding brake control for generating a specified brake hydraulic pressure to a wheel cylinder.

9 Claims, 4 Drawing Sheets

(51) Int. Cl.
    *B60T 8/32*         (2006.01)
    *B60T 13/14*       (2006.01)

(52) U.S. Cl.
    CPC ....... *B60T 13/146* (2013.01); *B60T 2201/022* (2013.01); *B60T 2201/024* (2013.01); *B60T 2201/03* (2013.01); *B60T 2201/122* (2013.01)

(58) Field of Classification Search
    CPC ......... B60T 2201/022; B60T 2201/024; B60T 2201/03; B60T 2201/122; B60W 10/184; B60W 30/09; B60W 30/095
    USPC ........................................ 701/70, 76, 78, 83
    See application file for complete search history.

(56) References Cited

U.S. PATENT DOCUMENTS

| | | |
|---|---|---|
| 2002/0091479 A1 | 7/2002 | Maruko et al. |
| 2002/0133284 A1 | 9/2002 | Manaka et al. |
| 2003/0085612 A1 | 5/2003 | Bond, III et al. |
| 2014/0229086 A1* | 8/2014 | Udaka ................ B60T 8/17616 701/75 |

* cited by examiner

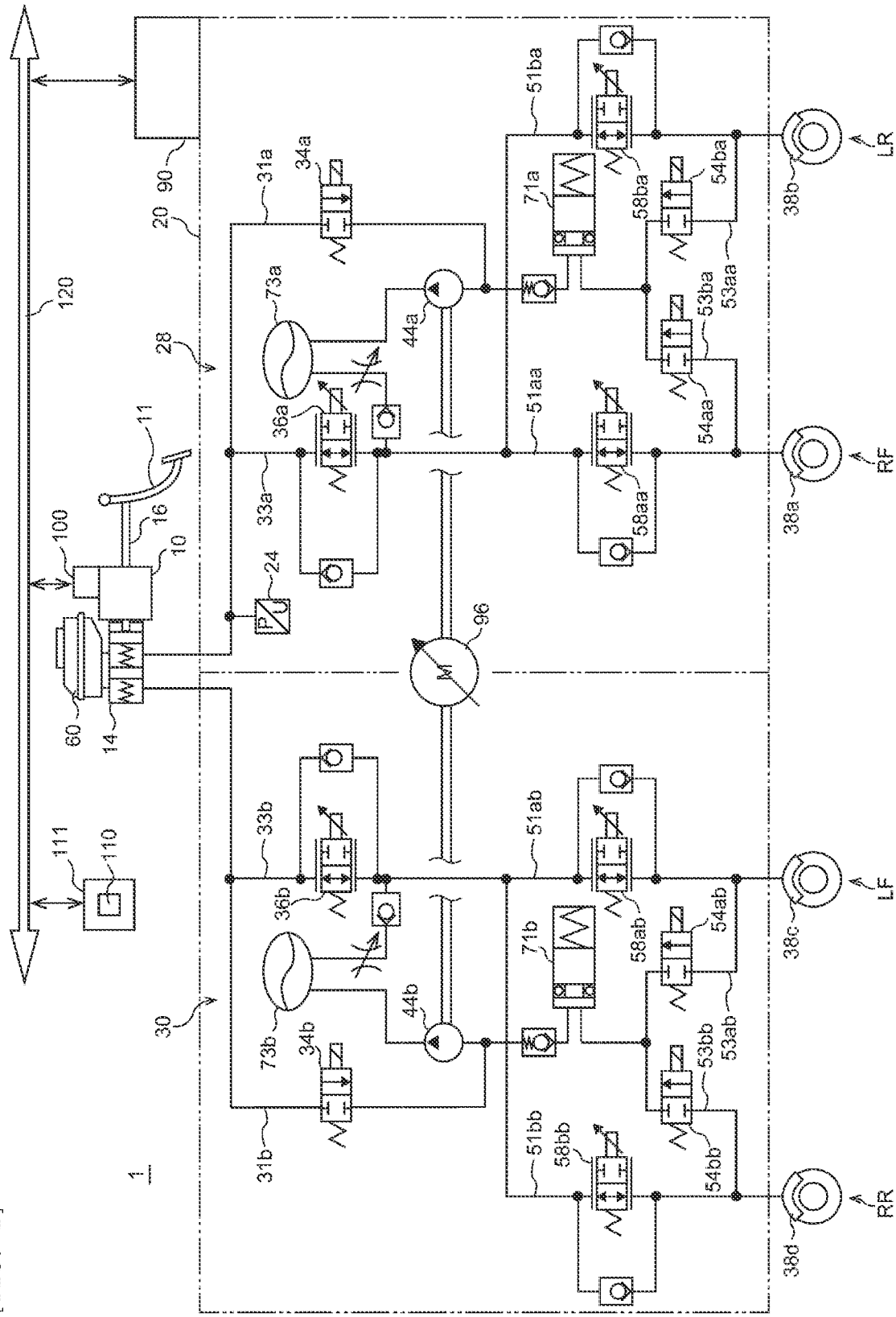
[FIG. 1]

[FIG. 2]
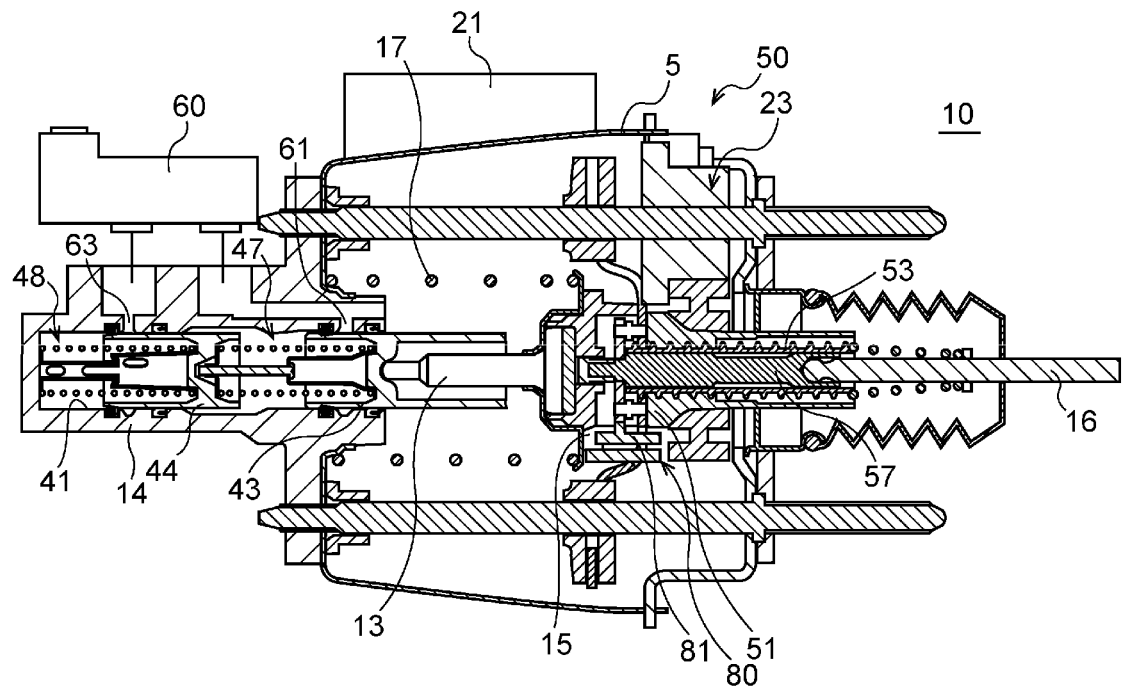
[FIG. 3]
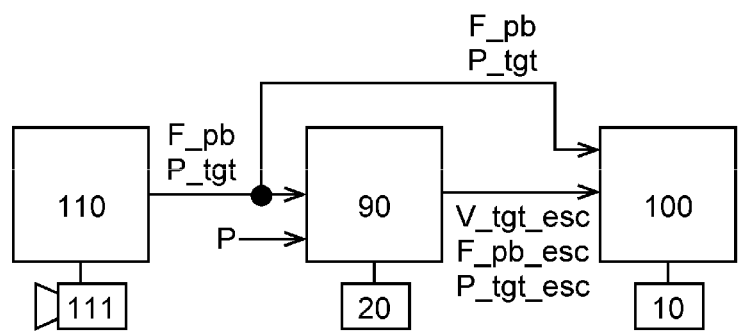

[FIG. 4]
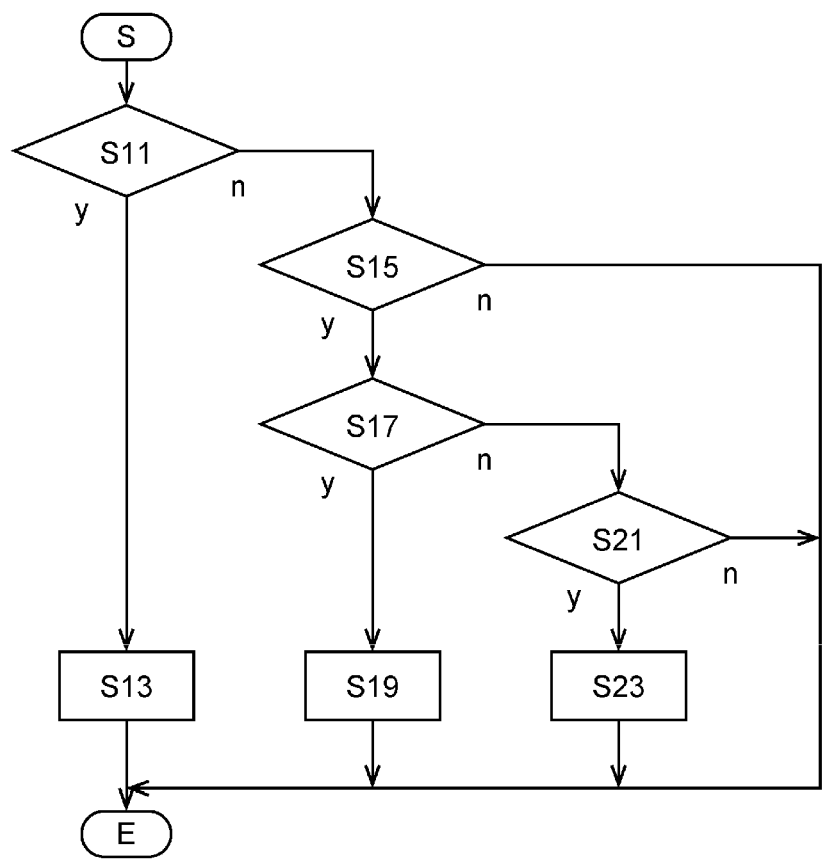

[FIG. 5]
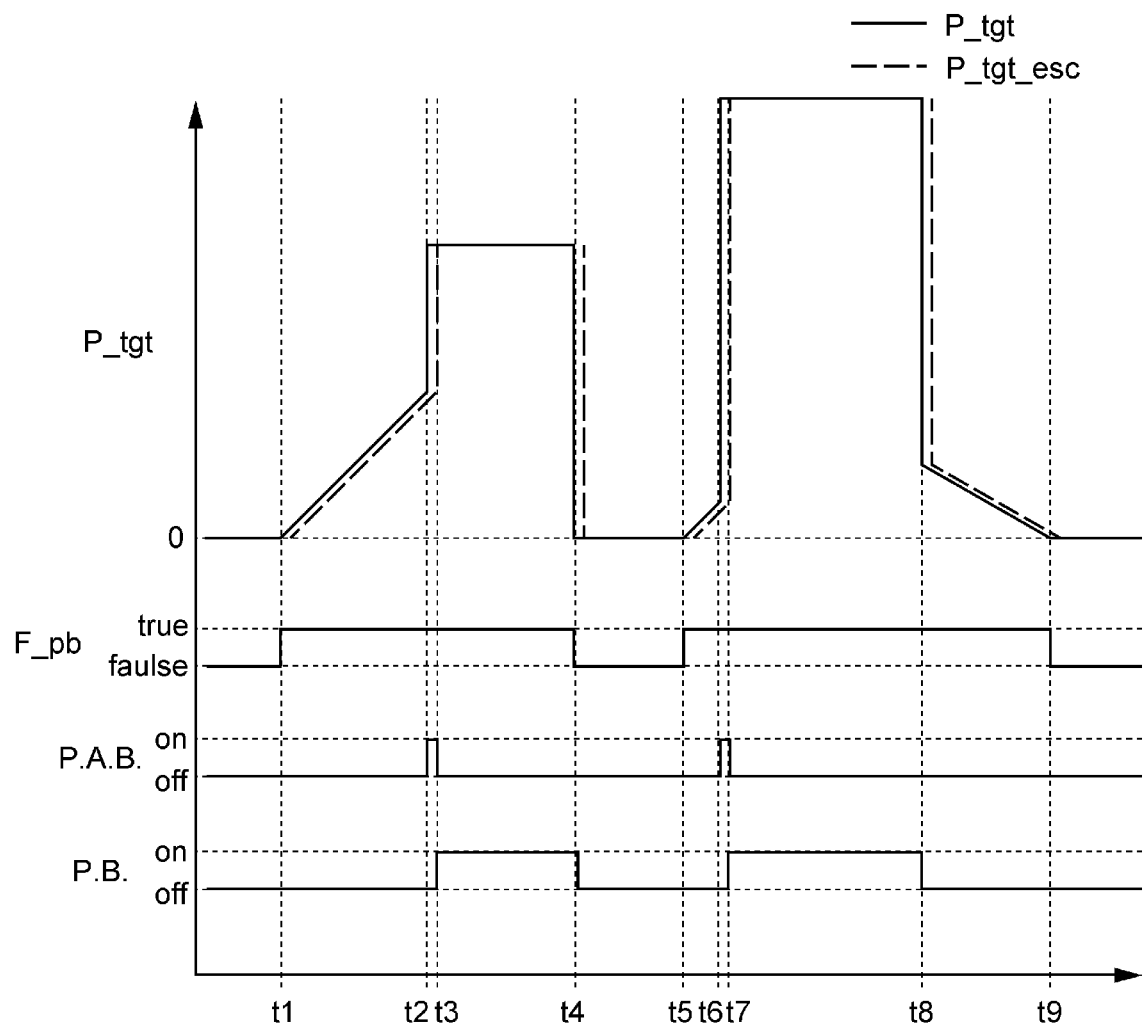

VEHICLE BRAKE SYSTEM

BACKGROUND OF THE INVENTION

The present invention relates to a vehicle brake system.

In a brake system for an automobile such as a passenger car, an electric booster that boosts brake operation input by a driver at a specified servo ratio to generate large output has been in practical use. When an input shaft of the electric booster receives the brake operation input by the driver, the electric booster boosts this input with output of an electric motor, pushes a push-rod forward, and presses a master cylinder piston. Consequently, hydraulic oil in the master cylinder is supplied to a hydraulic unit and increases a wheel cylinder pressure.

The brake system including the electric booster executes pre-crash brake control in which a pre-crash brake is actuated when a collision of a vehicle is predicted by a monitoring device such as a camera or a radar that monitors environment ahead of the vehicle. In the pre-crash brake control, the monitoring device generates an execution request of the pre-crash brake and information on a target value for decelerating a vehicle and sends the execution request and the information to a controller that controls the hydraulic unit. The controller for the hydraulic unit converts the received information on the target value to a target flow rate of a brake fluid used for control of the electric booster, and sends the target flow rate to the controller for the electric booster. The controller for the electric booster determines a moving speed of the master cylinder piston on the basis of the received target flow rate, and drives the electric motor.

SUMMARY OF THE INVENTION

Here, in the vehicle, the monitoring device such as the camera or the radar, the controller for the hydraulic unit, and the controller for the electric booster mutually exchange messages via communication means such as a controller area network (CAN). Due to a response delay of such communication means and a processing time for converting the target value, which is received by the controller for the hydraulic unit, to the target flow rate of the brake fluid, actuation of the pre-crash brake by the controller for the electric booster delays from time at which the execution request of the pre-crash brake is sent from the monitoring device. Since it is desired to actuate the pre-crash brake as soon as possible, it is desired to shorten such a delay time as much as possible.

The present invention has been made in view of the above problem and therefore provides a vehicle brake system capable of shortening a delay time from time at which an execution request of a pre-crash brake executed by actuation of an electric booster to time at which the pre-crash brake is actually actuated.

In order to solve the above problem, one aspect of the present invention provides a vehicle brake system including: a hydraulic unit that regulates a brake hydraulic pressure generated to a wheel cylinder of a wheel; a braking control section that controls the hydraulic unit; a master cylinder that supplies a brake fluid to the hydraulic unit; an electric booster that uses output torque of an electric motor to boost brake operation input and transmits the boosted brake operation input to the master cylinder; a booster control section that controls the electric booster on the basis of a command from the braking control section; and a pre-crash brake execution determination section that predicts a collision of a vehicle and determines execution of pre-crash brake operation. The pre-crash brake execution determination section sends information on a specified target value for decelerating the vehicle to the booster control section and the braking control section. When a change amount of the target value, which is received from the pre-crash brake execution determination section, exceeds a specified threshold value, the booster control section drives the electric booster prior to the command from the braking control section and executes preceding brake control for generating a specified brake hydraulic pressure to the wheel cylinder.

According to the present invention that has been described so far, it is possible to reduce a delay time from time at which an execution request of a pre-crash brake executed by actuation of the electric booster is sent to time at which the pre-crash brake is actually actuated.

BRIEF DESCRIPTION OF THE DRAWINGS

FIG. 1 is an explanatory view illustrating a configuration example of a vehicle brake system for which an electric booster according to an embodiment of the present invention is used.

FIG. 2 is an explanatory view illustrating a configuration example of the electric booster.

FIG. 3 is a block diagram illustrating a configuration example of the vehicle brake system related to preceding brake control.

FIG. 4 is a flowchart illustrating an example of processing by the vehicle brake system according to the embodiment.

FIG. 5 is an explanatory chart illustrating operation of the vehicle brake system according to the embodiment.

DETAILED DESCRIPTION

A detailed description will hereinafter be made on a preferred embodiment of the present invention with reference to the accompanying drawings. In the present specification and the drawings, components having substantially the same functional configuration will be denoted by the same reference sign, and a description thereon will not be repeated.

<1. Overall Configuration of Vehicle Brake System>

First, a description will be made on an overall configuration of a vehicle brake system according to this embodiment with reference to FIG. 1. FIG. 1 is a schematic view illustrating a configuration example of a vehicle brake system 1, and FIG. 2 is a cross-sectional view of a configuration example of an electric booster (hereinafter, simply referred to as a "booster") 10. In FIG. 2, side surfaces of some components are illustrated.

The vehicle brake system 1 illustrated in FIG. 1 is a brake system for a four-wheeled motor vehicle. The brake system 1 includes two brake lines and is applied to a brake device of a so-called X-shaped piping method in which each of the lines brakes a front wheel and a rear wheel at diagonal positions as a pair. However, the brake system may be applied to a brake system of a so-called H-shaped piping method in which one of the lines brakes front and rear left wheels and the other line brakes front and rear right wheels. In addition, the brake system may be a brake system for a vehicle that includes a two-wheeled motor vehicle in addition to the four-wheeled motor vehicle.

The brake system 1 includes: a front monitoring device 111 that monitors environment ahead of the vehicle, a booster 10, a master cylinder 14, and a hydraulic unit 20. The front monitoring device 111 has a function of monitoring presence or absence of another vehicle, a pedestrian, a bicycle, an obstacle, and the like ahead of the vehicle (hereinafter collectively referred to as "obstacles"). The front monitoring device 111 is configured to include at least one of a camera, a radar, and a LiDAR, for example. The brake system 1 also includes a pre-crash brake execution determination section 110 that determines execution of a pre-crash brake by processing data that is acquired by the front monitoring device 111. The pre-crash brake execution determination section 110 is configured to include a central processing unit (CPU) or a graphics processing unit (GPU), for example.

Furthermore, the brake system 1 includes: a braking controller 90 that controls the hydraulic unit 20; and a booster controller 100 that controls the booster 10. Each of the braking controller 90 and the booster controller 100 is partially or entirely constructed of a microcomputer, a microprocessor unit, or the like, for example. Each of the pre-crash brake execution determination section 110, the braking controller 90, and the booster controller 100 may partially or entirely be constructed of a member in which firmware or the like can be updated, or may partially or entirely be a program module or the like that is executed by a command from the CPU or the like.

The pre-crash brake execution determination section 110, the braking controller 90, and the booster controller 100 are configured to be mutually communicable via a communication bus 120 such as a CAN. In this embodiment, the braking controller 90 and the booster controller 100 have functions as a braking control section and a booster control section, respectively.

In the brake system 1, a depression force applied to a brake pedal 11 is boosted by the booster 10 and is transmitted to the master cylinder 14 as a hydraulic pressure generation source. The master cylinder 14 is formed with a primary chamber 47 and a secondary chamber 48 as two pressurized chambers that are defined by a primary piston 43 and a secondary piston 44 (see FIG. 2). In response to a depressing operation of the brake pedal 11 by a driver, the primary piston 43 and the secondary piston 44 are pressed to cause a brake fluid to move into the hydraulic unit 20 via hydraulic ports, each of which is not illustrated and communicates with respective one of the primary chamber 47 and the secondary chamber 48.

The booster 10 is connected to the brake pedal 11 side via an input shaft 16, and the depression force boosted by the booster 10 is transmitted to the master cylinder 14 via a push-rod 13 that is coupled to the primary piston 43. In this embodiment, an electric booster is used as the booster 10.

The booster 10 includes a housing 5, the input shaft 16, the push-rod 13, a valve body 15, an electric motor 21, an assist mechanism 50, and a return spring 17. The push-rod 13, the assist mechanism 50, and the return spring 17 are accommodated in the housing 5. The master cylinder 14 of a tandem type is coupled to a front side of the housing 5. A reservoir tank 60 used to supply the brake fluid to the master cylinder 14 is attached to an upper portion of the master cylinder 14. The master cylinder 14 includes the primary piston 43 and the secondary piston 44, each of which is arranged in an axially movable manner in a bottomed cylinder bore 41. The primary piston 43 is arranged on a near side of the push-rod 13, and the secondary piston 44 is arranged on a far side of the push-rod 13.

The primary chamber 47 is provided between the primary piston 43 and the secondary piston 44, and the secondary chamber 48 is provided between the secondary piston 44 and a bottom portion of the cylinder bore 41. One end of the push-rod 13, which is advanced by output torque of the electric motor 21 and presses the primary piston 43, abuts the primary piston 43. Due to the axial movement of the primary piston 43, the secondary piston 44 also moves in the axial direction. The primary chamber 47 and the secondary chamber 48 are formed with a first reservoir port 61 and a second reservoir port 63, each of which communicates with the reservoir tank 60, respectively. Accordingly, the brake fluid is supplied from the reservoir tank 60 to the primary chamber 47 and the secondary chamber 48.

The electric motor 21 may be a brushless DC/DC motor that includes a stator as a fixed element and a rotor as a movable element, for example. The electric motor 21 is actuated when being supplied with electric power (an electric current) controlled by the booster controller 100. The electric motor 21 is a motor that can rotate positively to advance the push-rod 13 and can rotate reversely to retard the push-rod 13 by switching a direction of the current.

When receiving output of the electric motor 21, the assist mechanism 50 causes the valve body 15 and the push-rod 13 to move to the master cylinder 14 side. The assist mechanism 50 includes a deceleration mechanism 23, a spindle nut 51, a spindle 53, and the plunger 57. The deceleration mechanism 23 is configured by using a gear-type deceleration mechanism, for example, decelerates rotation of the electric motor 21 at a specified deceleration rate, and transmits the decelerated rotation to the spindle nut 51. With rotation of the spindle nut 51, the spindle 53 can move relative to the spindle nut 51 in the axial direction.

The booster 10 includes a stroke sensor 80. The stroke sensor 80 detects relative displacement of the plunger 57 to the valve body 15 and outputs a sensor signal to the booster controller 100.

The booster controller 100 determines the relative displacement of the plunger 57 and the push-rod 13 to the valve body 15 on the basis of a magnitude of the current input from the stroke sensor 80. In addition, the booster controller 100 sets, as a reference value, the current of the stroke sensor 80, which is generated in an inoperative condition of the booster 10, to zero. At this time, the booster controller 100 does not supply the electric power (the current) to the stator of the electric motor 21. Meanwhile, when the driver depresses the brake pedal 11, the plunger 57 and the push-rod 13 displaces relative to the valve body 15. As a result, the stroke sensor 80 generates the current corresponding to the displacement of the plunger 57 and the push-rod 13 and outputs the current to the booster controller 100. The booster controller 100 supplies the electric power (the current) to the stator of the electric motor 21.

A first hydraulic circuit 28 and a second hydraulic circuit 30 extend from the hydraulic ports, each of which communicates with respective one of the primary chamber 47 and the secondary chamber 48 in the master cylinder 14, toward hydraulic brakes 38a to 38d for wheels RF, LR, LF, RR. Each of the hydraulic circuits in the vehicle brake system 1 according to this embodiment is of the X-shaped piping method. The brake fluid is supplied to a wheel cylinder of the hydraulic brake 38a for the front right wheel RF and a wheel cylinder of the hydraulic brake 38b for the rear left wheel LR via the first hydraulic circuit 28. In addition, the brake fluid is supplied to a wheel cylinder of the hydraulic brake 38c for the front left wheel LF and a wheel cylinder of the hydraulic brake 38d for the rear right wheel RR via the second hydraulic circuit 30. In this way, each of the hydraulic brakes 38a to 38d can use the hydraulic pressure to generate a braking force onto respective one of the wheels RF, LR, LF, RR.

The hydraulic unit 20 includes the first hydraulic circuit 28 and the second hydraulic circuit 30 that have the same configurations. The brake fluid is supplied from the master cylinder 14 to each of the first hydraulic circuit 28 and the second hydraulic circuit 30. A brief description will hereinafter be made on the first hydraulic circuit 28, and a description on the second hydraulic circuit 30 will not be made.

The first hydraulic circuit 28 includes, as electromagnetic valves: a circuit control valve 36a of a normally open type that can be controlled linearly; a suction valve 34a of a normally closed type that is subjected to on/off control; booster regulators (regulation valves) 58aa, 58ba, each of which is of the normally open type and can be controlled linearly; and pressure regulators 54aa, 54ba, each of which is of the normally closed type and is subjected to the on/off control. The first hydraulic circuit 28 also includes a pump 44a that is driven by a pump motor 96, a low-pressure accumulator 71a, and a damper 73a. The number of the pump 44a is not limited to one.

The first booster regulator 58aa and the first pressure regulator 54aa that are provided adjacent to the hydraulic brake 38a for the front right wheel RF are used for anti-lock braking system (ABS) control or electronic stability control (ESC) of the front right wheel RF. The second booster regulator 58ba and the second pressure regulator 54ba that are provided adjacent to the hydraulic brake 38b for the rear left wheel LR are used for the ABS control or the ESC of the rear left wheel LR.

The first booster regulator 58aa for the front right wheel RF is provided between the circuit control valve 36a and the hydraulic brake 38a for the front right wheel RF. The first booster regulator 58aa, which can be controlled linearly, continuously regulates a flow rate of the brake fluid from the circuit control valve 36a side to the wheel cylinder side of the hydraulic brake 38a for the front right wheel RF. The first booster regulator 58aa includes a bypass channel including a check valve. The check valve allows a flow of the brake fluid from the hydraulic brake 38a side to the circuit control valve 36a side while restricting a reverse flow in a closed state of the first booster regulator 58aa.

The first pressure regulator 54aa for the front right wheel RF is a solenoid valve that can only be switched between a fully open state and fully closed state, and is provided between the wheel cylinder of the hydraulic brake 38a for the front right wheel RF and the low-pressure accumulator 71a. In the fully open state, the first pressure regulator 54aa depressurizes the brake fluid that is supplied to the wheel cylinder of the hydraulic brake 38a for the front right wheel RF. The first pressure regulator 54aa is intermittently and repeatedly opened and closed and thus can regulate the flow rate of the brake fluid from the wheel cylinder of the hydraulic brake 38a for the front right wheel RF to the low-pressure accumulator 71a.

The second booster regulator 58ba for the rear left wheel LR is provided between the circuit control valve 36a and the hydraulic brake 38b for the rear left wheel LR. The second booster regulator 58ba, which can be controlled linearly, continuously regulates a flow rate of the brake fluid from the circuit control valve 36a side to the wheel cylinder side of the hydraulic brake 38b for the rear left wheel LR. The second booster regulator 58ba includes a bypass channel including a check valve. The check valve allows a flow of the brake fluid from the hydraulic brake 38b side to the circuit control valve 36a side while restricting a reverse flow in a closed state of the second booster regulator 58ba.

The second pressure regulator 54ba for the rear left wheel LR is a solenoid valve that can only be switched between a fully open state and fully closed state, and is provided between the wheel cylinder of the hydraulic brake 38b for the rear left wheel LR and the low-pressure accumulator 71a. In the fully open state, the second pressure regulator 54ba depressurizes the brake fluid that is supplied to the wheel cylinder of the hydraulic brake 38b for the rear left wheel LR. The second pressure regulator 54ba is intermittently and repeatedly opened and closed and thus can regulate the flow rate of the brake fluid from the wheel cylinder of the hydraulic brake 38b for the rear left wheel LR to the low-pressure accumulator 71a.

The circuit control valve 36a is provided to make the master cylinder 14 communicate with the booster regulators 58aa, 58ba or to block the communication between the master cylinder 14 and each of the booster regulators 58aa, 58ba. The suction valve 34a is provided to make the master cylinder 14 communicate with a suction side of the pump 44a or to block the communication between the master cylinder 14 and the suction side of the pump 44a. A hydraulic pressure sensor 24 is provided to a pipeline between the master cylinder 14 and each of the circuit control valve 36a and the suction valve 34a. These are similar to the components of the hydraulic unit 20. Thus, a detailed description thereon will not be made.

The second hydraulic circuit 30 controls the hydraulic brake 38c for the front left wheel LF and the hydraulic brake 38d for the rear right wheel RR. The second hydraulic circuit 30 is configured similarly to the first hydraulic circuit 28 except for points that the wheel cylinder of the hydraulic brake 38a for the front right wheel RF in the description of the first hydraulic circuit 28 is replaced with the wheel cylinder of the hydraulic brake 38c for the front left wheel LF and that the wheel cylinder of the hydraulic brake 38b for the rear left wheel LR is replaced with the wheel cylinder of the hydraulic brake 38d for the rear right wheel RR.

<2. Preceding Brake Control>

Next, a description will be made on preceding brake control executed by the vehicle brake system 1 according to this embodiment.

The preceding brake control is control for automatically generating the braking force prior to the driver's brake operation at the time when the front monitoring device 111 predicts that the vehicle will collide with the other vehicle, the pedestrian, the bicycle, the obstacle, or the like existing ahead of the vehicle. When such preceding brake control is executed, the collision is avoided, or damage caused by the collision is reduced. Accordingly, it is desired that the preceding brake control is promptly executed after the collision of the vehicle is predicted.

FIG. 3 is a block diagram illustrating a functional configuration related to the preceding brake control of the configuration of the brake system 1. In the brake system 1 according to this embodiment, the preceding brake control is executed when the braking controller 90 and the booster controller 100 control the hydraulic unit 20 and the booster 10 while the pre-crash brake execution determination section 110, the braking controller 90, and the booster controller 100 communicate with each other.

(Pre-Crash Brake Execution Determination Section)

The pre-crash brake execution determination section 110 having a function as the pre-crash brake execution determination section processes the data that is acquired by the front monitoring device 111 including the camera, the radar, and the LiDAR, to predict the collision of the vehicle, and determines execution of pre-crash brake operation. For example, in the case where the front monitoring device 111 is the camera, the pre-crash brake execution determination section 110 recognizes the obstacle in front, such as the other vehicle, by image recognition processing and at least calculates a distance to the obstacle and a relative speed to the obstacle. The pre-crash brake execution determination section 110 predicts the collision of the vehicle on the basis of calculated information. The method for predicting the collision by the pre-crash brake execution determination section 110 is not particularly limited. For example, the pre-crash brake execution determination section 110 refers to map information in which a possibility of the collision is set in advance according to the distance to the obstacle and the relative speed to the obstacle, and thereby predicts the collision of the vehicle on the basis of the distance to the obstacle and the relative speed to the obstacle.

The pre-crash brake execution determination section 110 sends information on a pre-crash brake execution request flag F_pb and information on a specified target value P_tgt for decelerating the vehicle to the braking controller 90 and the booster controller 100. In the brake system 1 according to this embodiment, the pre-crash brake execution determination section 110 sends the information on the pre-crash brake execution request flag F_pb and the information on the specified target value P_tgt for decelerating the vehicle not only to the braking controller 90 that governs overall brake control but also to the booster controller 100. The braking controller 90 and the booster controller 100 can always monitor the information on the pre-crash brake execution request flag F_pb and the information on the specified target value P_tgt for decelerating the vehicle.

The specified target value for decelerating the vehicle may be a target value of a brake hydraulic pressure or a target value of acceleration (deceleration) of the vehicle, for example. In the following embodiment, a description will be made on an example in which the pre-crash brake execution determination section 110 sends the information on the target value P_tgt of the brake hydraulic pressure as the information on the specified target value for the decelerating the vehicle.

In the case where the pre-crash brake execution determination section 110 predicts the collision of the vehicle and determines that the execution of the pre-crash brake is necessary, the pre-crash brake execution determination section 110 sets the pre-crash brake execution request flag F_pb to true. In a state where the collision of the vehicle is not predicted, the pre-crash brake execution determination section 110 sets the pre-crash brake execution request flag F_pb to false. The calculation method of the target value P_tgt of the brake hydraulic pressure is not particularly limited. For example, a time until the vehicle collides with the obstacle differs by the distance to the obstacle and the relative speed to the obstacle. Thus, the pre-crash brake execution determination section 110 may refer to map information, in which the target value is set in advance according to the distance to the obstacle and the relative speed to the obstacle, and may calculate the target value P_tgt of the brake hydraulic pressure. In the state where the collision of the vehicle is not predicted, the target value P_tgt of the brake hydraulic pressure is set to zero.

Here, only in the case where the pre-crash brake execution determination section 110 determines that the execution of the pre-crash brake is necessary, the pre-crash brake execution determination section 110 may send the information on the pre-crash brake execution request flag F_pb and the information on the target value P_tgt of the brake hydraulic pressure.

(Braking Controller)

The braking controller 90 basically executes the ABS control and the ESC by controlling the hydraulic unit 20. In addition, the braking controller 90 always monitors the information sent from the pre-crash brake execution determination section 110. In the case where the pre-crash brake execution request flag F_pb is true, the braking controller 90 generates a control command of the booster 10 and executes the pre-crash brake control. In the ABS control and the ESC, the braking controller 90 controls the hydraulic unit 20 and individually controls the brake hydraulic pressure of the wheel cylinder for each of the wheels. Meanwhile, in the pre-crash brake control, the braking controller 90 sends the control command of the booster 10 to the booster controller 100 and controls the brake hydraulic pressure of the wheel cylinder for each of the wheels. That is, in the pre-crash brake control, the brake fluid is supplied from the master cylinder 14 to the hydraulic unit 20. In this way, the brake hydraulic pressure of the wheel cylinder for each of the wheels is increased to generate the braking force of the vehicle.

More specifically, in the case where the pre-crash brake execution request flag F_pb is true, the braking controller 90 sets a target flow rate V_tgt_esc of the brake fluid to be supplied from the master cylinder 14 to the hydraulic unit 20 on the basis of the received information on the target value P_tgt of the brake hydraulic pressure and a pressure value P detected by the hydraulic pressure sensor 24. Since the pressure value P detected by the hydraulic pressure sensor 24 can be regarded as the brake hydraulic pressure of the wheel cylinder, in this embodiment, the hydraulic pressure sensor 24 functions as the brake hydraulic pressure detecting section that detects the brake hydraulic pressure. In the case where a brake hydraulic pressure sensor that detects the brake hydraulic pressure of any of the wheel cylinders is provided in addition to the hydraulic pressure sensor 24, such a brake hydraulic pressure sensor may be used as the brake hydraulic pressure detecting section.

The braking controller 90 sets the target flow rate V_tgt_esc according to the target value P_tgt of the brake hydraulic pressure. For example, the braking controller 90 may refer to a flow rate map in which the target flow rate V_tgt_esc is set according to the target value P_tgt of the brake hydraulic pressure, and may set the target flow rate V_tgt_esc of the brake fluid. The target flow rate V_tgt_esc may be set according to a difference between the current brake hydraulic pressure and the target value P_tgt of the brake hydraulic pressure.

After setting the target flow rate V_tgt_esc of the brake fluid, the braking controller 90 sends the information on the target flow rate V_tgt_esc of the brake fluid to the booster controller 100. In addition, the braking controller 90 sends the information on the pre-crash brake execution request flag F_pb (F_pb_esc) received from the pre-crash brake execution determination section 110 and the information on the target value P_tgt (P_tgt_esc) of the brake hydraulic pressure as is to the booster controller 100.

The braking controller 90 receives the above information from the pre-crash brake execution determination section 110. Then, in the case where the pre-crash brake execution request flag F_pb is true, the braking controller 90 sets the target flow rate V_tgt_esc of the brake fluid and then sends the above information to the booster controller 100. Accordingly, the braking controller 90 sends the information on the pre-crash brake execution request flag F_pb (F_pb_esc) received from the pre-crash brake execution determination section 110 and the information on the target value P_tgt (P_tgt_esc) of the brake hydraulic pressure as is to the booster controller 100. Meanwhile, the booster controller 100 receives the same information from the pre-crash brake execution determination section 110 before receiving these types of the information from the braking controller 90.

(Booster Controller)

Basically, the booster controller 100 controls the booster 10 on the basis of the control command from the braking controller 90 and executes the pre-crash brake control. The booster controller 100 according to this embodiment executes the preceding brake control prior to execution of the pre-crash brake, which is based on the control command from the braking controller 90, on the basis of the information on the pre-crash brake execution request flag F_pb, which is directly sent from the pre-crash brake execution determination section 110, and the information on the target value P_tgt of the brake hydraulic pressure. As described above, a delay time exists from time at which the pre-crash brake execution determination section 110 sends the information on the pre-crash brake execution request flag F_pb and the information on the target value P_tgt of the brake hydraulic pressure to the braking controller 90 to time at which the braking controller 90 sends the control command to the booster controller 100. The booster controller 100 executes the preceding brake control prior to the execution of the pre-crash brake, which is based on the control command from the braking controller 90. In this way, it is possible to shorten the delay time.

The booster controller 100 always monitors the information on the pre-crash brake execution request flag F_pb, which is sent from the pre-crash brake execution determination section 110, and the information on the target value P_tgt of the brake hydraulic pressure. Then, when the pre-crash brake execution request flag F_pb becomes true, the booster controller 100 starts executing the preceding brake control. More specifically, the booster controller 100 executes the preceding brake control when a change amount ΔP of the target value P_tgt of the brake hydraulic pressure received from the pre-crash brake execution determination section 110 exceeds a specified threshold value ΔP_thr. The change amount ΔP of the target value P_tgt of the brake hydraulic pressure is acquired per cycle in which the booster controller 100 reads the target value P_tgt of the brake hydraulic pressure, and is a difference between the target value P_tgt in a current cycle and the target value P_tgt read in the last cycle. The specified threshold value ΔP_thr is set according to an output specification of the pre-crash brake execution determination section 110, for example. For example, in the case of a system that accompanies preliminary boosting for emergency actuation during the execution of the pre-crash brake control, the higher threshold value ΔP_thr than the change amount ΔP of the target value P_tgt of the brake hydraulic pressure generated by the preliminary boosting. In this way, it is possible to enable a function of shortening the delay time when the booster controller 100 detects the emergency actuation of the pre-crash brake execution determination section 110.

In addition, the booster controller 100 sets a target flow rate V_tgt of the brake fluid to be supplied from the master cylinder 14 to the hydraulic unit 20 on the basis of the change amount ΔP of the target value P_tgt of the brake hydraulic pressure. For example, the target flow rate V_tgt of the brake fluid may be set on the basis of a difference between the target value P_tgt of the brake hydraulic pressure received from the pre-crash brake execution determination section 110 and a detection value P_act detected by the hydraulic pressure sensor 24 and received from the braking controller 90 and on the basis of a displacement amount of the push-rod 13 detected by the stroke sensor 80 in the booster 10. Furthermore, the booster controller 100 sets a drive amount of the electric motor 21 for the booster 10 on the basis of the calculated target flow rate V_tgt, and outputs a drive signal to the electric motor 21. In this way, the push-rod 13 advances at a speed corresponding to the drive amount of the electric motor 21, and the brake fluid is thereby supplied from the master cylinder 14 to the hydraulic unit 20. As a result, the brake hydraulic pressure of the wheel cylinder for each of the wheels is boosted, and the braking force of the vehicle is generated.

The booster controller 100 stores, as an initial value P_tgt_0, the target value P_tgt of the brake hydraulic pressure at the time when the change amount ΔP of the target value P_tgt of the brake hydraulic pressure exceeds the threshold value ΔP_thr, and stores, as an initial flow rate V_tgt_0, the target flow rate V_tgt of the brake fluid corresponding to the initial value P_tgt_0. In this embodiment, information on the stored initial value P_tgt_0 of the brake hydraulic pressure and information on the stored initial flow rate V_tgt_0 of the brake fluid are used for a termination determination of the preceding brake control.

For example, the booster controller 100 may terminate the preceding brake control when the target value P_tgt_esc of the brake hydraulic pressure, which is sent from the braking controller 90 in a delayed fashion, reaches the stored initial value P_tgt_0 and the target flow rate V_tgt of the brake fluid, which is calculated on the basis of the change amount ΔP of the target value P_tgt of the hydraulic pressure of the brake fluid, exceeds the stored initial flow rate V_tgt_0 by a specified rate or higher. Such a termination determination is a determination on whether the pre-crash brake control is validly executed on the basis of the information sent from the braking controller 90. After terminating the preceding brake control, the booster controller 100 continues the pre-crash brake control on the basis of the control command from the braking controller 90. In this way, the preceding brake control is smoothly shifted to the pre-crash brake control. That is, the preceding brake control is control that is executed for a short period of time in order to shorten the delay time until the pre-crash brake control starts being executed on the basis of the control signal from the braking controller 90.

In addition, the booster controller 100 may forcibly terminate the preceding brake control in the case where the preceding brake control is continued even after a maximum time, which is set in advance, elapses from the initiation of the preceding brake control. For example, the maximum time is set on the basis of a response delay time that is predicted for the entire brake system 1 in which the pre-crash brake execution determination section 110 sends the information, the booster controller 100 receives the information via the braking controller 90, and the booster 10 is actuated. In the case where the preceding brake control is not terminated even with a lapse of the predicted response delay time, a certain type of abnormality possibly occurs to the brake system 1. Thus, when the preceding brake control is forcibly terminated in such a case, it is possible to suppress occurrence of an unexpected event.

Furthermore, the booster controller 100 may forcibly terminate the preceding brake control in the case where the difference between the target value P_tgt of the brake hydraulic pressure received from the pre-crash brake execution determination section 110 and the detection value P_act detected by the hydraulic pressure sensor 24 becomes equal to or lower than a threshold value, which is set in advance, during the execution of the preceding brake control. More specifically, in the case where the difference between the detected detection value P_act and the target value P_tgt of the brake hydraulic pressure becomes equal to or lower than a certain value, the actual brake hydraulic pressure exceeds the target value P_tgt, which possibly deteriorates stability of the vehicle. For this reason, the booster controller 100 forcibly terminates the preceding brake control. The threshold value can be set to an appropriate value in consideration of an increase speed of the pressure in the brake system 1, and the like.

Moreover, the booster controller 100 may prohibit the execution of the preceding brake control for a specified period after the termination of the preceding brake control. In this way, it is possible to suppress an unintended increase in the brake hydraulic pressure caused by the continued preceding brake control and thus to suppress the deterioration of the stability of the vehicle.

<3. Operation Example of Brake System>

Next, a description will be made on a specific operation example of the vehicle brake system 1 according to this embodiment.

FIG. 4 is a flowchart illustrating preceding brake control processing that is executed by the booster controller 100 of the brake system 1 according to this embodiment. The flowchart illustrated in FIG. 4 is constantly executed while the vehicle brake system 1 is activated.

First, the booster controller 100 determines whether an initiation condition of the preceding brake control is satisfied (step S11). More specifically, the booster controller 100 determines whether the pre-crash brake execution request flag F_pb, which is received from the pre-crash brake execution determination section 110, is true, the change amount ΔP of the target value P_tgt of the brake hydraulic pressure, which is received from the pre-crash brake execution determination section 110, exceeds the specified threshold value ΔP_thr, and the execution of the pre-crash brake control is not prohibited. The threshold value ΔP_thr can appropriately be set to a value, with which it is possible to determine that the possibility of the collision of the vehicle is high, according to a characteristic of the brake system 1. For example, the threshold value ΔP_thr is set to a value within a range from 30 to 40 bar, for example.

If the initiation condition of the preceding brake control is satisfied (S11/Yes), the booster controller 100 initiates the preceding brake control (step S13), and the processing returns to Start. More specifically, the booster controller 100 permits the execution of the preceding brake control, and sets the target flow rate V_tgt of the brake fluid to be supplied from the master cylinder 14 to the hydraulic unit 20. For example, the target flow rate V_tgt of the brake fluid is set on the basis of the difference between the target value P_tgt of the brake hydraulic pressure, which is received from the pre-crash brake execution determination section 110, and the detection value P_act, which is detected by the hydraulic pressure sensor 24 and received from the braking controller 90, and on the basis of the displacement amount of the push-rod 13, which is detected by the stroke sensor 80 of the booster 10. In addition, the booster controller 100 stores, as the initial value P_tgt_0, the target value P_tgt of the brake hydraulic pressure at the time when the preceding brake control starts being executed, and stores, as the initial flow rate V_tgt_0, the target flow rate V_tgt of the brake fluid. Furthermore, the booster controller 100 starts counting by a clock counter A.

If the initiation condition of the preceding brake control is not satisfied (S11/No), the booster controller 100 determines whether the preceding brake control is currently executed (step S15). The following steps are provided for processing that terminates the preceding brake control. Thus, if the preceding brake control is not currently executed (S15/No), the processing returns to Start as is.

On the other hand, if the preceding brake control is currently executed (S15/Yes), the booster controller 100 determines whether a forcible termination condition of the preceding brake control is satisfied (step S17). More specifically, the booster controller 100 determines whether any of the following conditions is satisfied. The conditions are that the counting by the clock counter A, which is started in step S13, reaches the maximum time, which is set in advance, and that the difference between the initial value P_tgt_0 of the target value P_tgt of the brake hydraulic pressure and the detection value P_act detected by the hydraulic pressure sensor 24 is equal to or lower than the specified threshold value. The maximum time can appropriately be set according to the predicted response delay time of the entire brake system 1. For example, the maximum time can be set to a value within a range from 40 to 60 milliseconds. The threshold value can appropriately be set in consideration of an increase speed of the pressure in the brake system 1, and the like. For example, the threshold value can be set to a value within a range from 12 to 18 bar.

If the forcible termination condition of the preceding brake control is satisfied (S17/Yes), the booster controller 100 forcibly terminates the preceding brake control (step S19), and the processing returns to Start. More specifically, the booster controller 100 promptly terminates the preceding brake control and initiates the pre-crash brake control, which is based on the control command sent from the braking controller 90. In addition, the booster controller 100 prohibits the execution of the preceding brake control for the specified period, which is set in advance. The specified period can appropriately be set in consideration of the characteristic of the brake system 1 in order to suppress the unintended increase in the brake hydraulic pressure caused by the continued preceding brake control. For example, the specified period can be set to fall within a range from three to six seconds.

On the other hand, if the forcible termination condition of the preceding brake control is not satisfied (S17/No), the booster controller 100 determines whether a normal termination condition of the preceding brake control is satisfied (step S21). More specifically, the booster controller 100 determines whether the target value P_tgt_esc of the brake hydraulic pressure, which is received from the braking controller 90, reaches the initial value P_tgt_0 of the target value P_tgt of the brake hydraulic pressure and the calculated target flow rate V_tgt of the brake fluid exceeds the stored initial flow rate V_tgt_0 by the specified rate or higher. An increased amount of the target flow rate V_tgt can appropriately be set such that the preceding brake control can smoothly be shifted to the pre-crash brake control based on the control command from the braking controller 90. The increased amount of the target flow rate V_tgt can be set to fall within a range from 12 to 18 bar, for example.

If the normal termination condition of the preceding brake control is not satisfied (S21/No), the processing returns to Start as is. On the other hand, if the normal termination condition of the preceding brake control is satisfied (S21/Yes), the booster controller 100 terminates the preceding brake control and initiates the pre-crash brake control, which is based on the control command sent from the braking controller 90 (step S23). Then, the processing returns to Start. More specifically, the booster controller 100 stops and initializes the clock counter A and terminates the preceding brake control. In addition, the booster controller 100 initiates the pre-crash brake control, which is based on the control command sent from the braking controller 90, and prohibits the execution of the preceding brake control for the specified period in order to prevent the brake hydraulic pressure from becoming excessive. The specified period can appropriately be set according to the characteristic of the entire brake system 1. For example, the specified period can be set within a range from 70 to 85 milliseconds.

<4. Operation of Brake System>

Next, a description will be made on operation of the brake system 1 according to this embodiment.

FIG. 5 is an explanatory chart illustrating operation in the case where the preceding brake control is executed in the brake system 1 according to this embodiment. In regard to the target value $P\_tgt$ of the brake hydraulic pressure, the target value $P\_tgt$ that is sent from the pre-crash brake execution determination section 110 to the booster controller 100 is indicated by a solid line, and the target value $P\_tgt\_esc$ that is sent from the braking controller 90 to the booster controller 100 is indicated by a broken line.

During travel of the vehicle, at time t1, the pre-crash brake execution determination section 110 predicts the collision of the vehicle and sets the pre-crash brake execution request flag $F\_pb$ to true. At the time t1 onward, with approach of the vehicle to the obstacle, the target value $P\_tgt$ of the brake hydraulic pressure, which is sent from the pre-crash brake execution determination section 110 to the booster controller 100, starts being increased. In addition, the target value $P\_tgt\_esc$ of the brake hydraulic pressure, which is sent from the braking controller 90 to the booster controller 100, starts being increased similarly in a slightly delayed fashion from the increase in the target value $P\_tgt$.

Next, at time t2, the target value $P\_tgt$ of the brake hydraulic pressure is rapidly increased, and the change amount $\Delta P$ of the target value $P\_tgt$ exceeds the specified threshold value $\Delta P\_thr$. At this time, the booster controller 100 starts executing the preceding brake control (P.A.B.). Thereafter, at time t3 at which the target value $P\_tgt\_esc$ of the brake hydraulic pressure, which is sent from the braking controller 90 to the booster controller 100, is rapidly increased, the normal termination condition of the preceding brake control is satisfied, and the booster controller 100 terminates the preceding brake control. At the time t3, the booster controller 100 initiates the pre-crash brake control (P.B.) that is based on the control command sent from the braking controller 90.

Next, at time t4, the target value $P\_tgt$ of the brake hydraulic pressure is rapidly reduced to zero, and the pre-crash brake execution determination section 110 sets the pre-crash brake execution request flag $F\_pb$ to false. Then, the booster controller 100 that has received such information terminates the pre-crash brake control.

Next, at time t5, the pre-crash brake execution determination section 110 predicts the collision of the vehicle again and sets the pre-crash brake execution request flag $F\_pb$ to true. At the time t5 onward, the target value $P\_tgt$ of the brake hydraulic pressure, which is sent from the pre-crash brake execution determination section 110 to the booster controller 100, starts being increased. In addition, the target value $P\_tgt\_esc$ of the brake hydraulic pressure, which is sent from the braking controller 90 to the booster controller 100, starts being increased similarly in the slightly delayed fashion from the increase in the target value $P\_tgt$.

Next, at time t6, the target value $P\_tgt$ of the brake hydraulic pressure is rapidly increased, and the change amount $\Delta P$ of the target value $P\_tgt$ exceeds the specified threshold value $\Delta P\_thr$. At this time, the booster controller 100 starts executing the preceding brake control (P.A.B.). Thereafter, at time t7 at which the target value $P\_tgt\_esc$ of the brake hydraulic pressure, which is sent from the braking controller 90 to the booster controller 100, is rapidly increased, the normal termination condition of the preceding brake control is satisfied, and the booster controller 100 terminates the preceding brake control. At the time t7, the booster controller 100 initiates the pre-crash brake control that is based on the control command sent from the braking controller 90.

Next, at time t8, the target value $P\_tgt$ of the brake hydraulic pressure is rapidly reduced. However, since the target value $P\_tgt$ is not zero, the pre-crash brake execution determination section 110 keeps the pre-crash brake execution request flag $F\_pb$ to true. Thereafter, at time t9, the target value $P\_tgt$ of the brake hydraulic pressure becomes zero, and the pre-crash brake execution determination section 110 sets the pre-crash brake execution request flag $F\_pb$ to false. Then, the booster controller 100 that has received such information terminates the pre-crash brake control.

Just as described, the preceding brake control is executed on the basis of the target value $P\_tgt$ of the brake hydraulic pressure, which is sent from the pre-crash brake execution determination section 110, in the period from the time at which the change amount $\Delta P$ of the target value $P\_tgt$ of the brake hydraulic pressure calculated by the pre-crash brake execution determination section 110 exceeds the specified threshold value $\Delta P\_thr$ to the time at which the booster controller 100 initiates the pre-crash brake control on the basis of the control command sent from the braking controller 90. In this way, it is possible to shorten the time until the generation of the braking force of the vehicle. As a result, it is possible to reduce the possibility of the collision of the vehicle or to reduce the damage caused by the collision.

In addition, also in regard to the termination of the pre-crash brake control, the pre-crash brake execution determination section 110 sets the pre-crash brake execution request flag $F\_pb$ to false, and then the booster controller 100 can promptly terminate the pre-crash brake control. Thus, it is possible to reduce a possibility of hindering the smooth travel of the vehicle.

As it has been described so far, according to the vehicle brake system 1 according to this embodiment, the booster controller 100 that controls the booster 10 directly receives the information on the pre-crash brake execution request flag $F\_pb$ and the information on the specified target value $P\_tgt$ for decelerating the vehicle from the pre-crash brake execution determination section 110. Then, the booster controller 100 can execute the preceding brake control prior to the pre-crash brake control, which is based on the control command sent from the braking controller 90. In this way, when the collision of the vehicle is predicted, it is possible to shorten the time until the generation of the braking force onto the vehicle.

In addition, the vehicle brake system 1 according to this embodiment is configured to execute the preceding brake control in the case where the pre-crash brake execution determination section 110 sets the pre-crash brake execution request flag $F\_pb$ to true and the change amount $\Delta P$ of the specified target value $P\_tgt$ for decelerating the vehicle exceeds the threshold value $\Delta P\_thr$. Accordingly, in the case where a degree of urgency that is estimated from the possibility of the collision of the vehicle is high, the preceding brake control is executed in the period until the braking controller 90 sends the control command to the booster controller 100. In this way, it is possible to execute the preceding brake control without hindering the smooth travel of the vehicle.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

REFERENCE SIGNS LIST

10: Electric booster
11: Brake pedal
13: Push-rod
14: Master cylinder
20: Brake hydraulic unit
21: Electric motor
43 Primary piston
44: Secondary piston
47: Primary chamber
48: Secondary chamber
60: Reservoir tank
68a, 69a: Seal member
100: Booster controller
110: Pre-crash brake execution determination section

The invention claimed is:

1. A vehicle brake system (1) comprising:
a hydraulic unit (20) that regulates a brake hydraulic pressure generated to a wheel cylinder;
a braking control section (90) that controls the hydraulic unit (20);
a master cylinder (14) that supplies a brake fluid to the hydraulic unit (20);
an electric booster (10) that uses output torque of an electric motor (21) to boost brake operation input and transmits the boosted brake operation input to the master cylinder (14);
a booster control section (100) that controls the electric booster (10) on the basis of a command from the braking control section (90); and
a pre-crash brake execution determination section (110) that predicts a collision of a vehicle and determines execution of pre-crash brake operation, wherein
the pre-crash brake execution determination section (110) sends information on a specified target value (P_tgt) for decelerating the vehicle to the booster control section (100) and the braking control section (90), and
when a change amount (ΔP) of the target value (P_tgt), which is received from the pre-crash brake execution determination section (110), exceeds a specified threshold value (ΔP_thr), the booster control section (100) drives the electric booster (10) prior to the command from the braking control section (90) and executes preceding brake control for generating a specified brake hydraulic pressure to the wheel cylinder.

2. The vehicle brake system according to claim 1, wherein the booster control section (100) sets a target flow rate (V_tgt) of the brake fluid according to the change amount (ΔP) of the target value (P_tgt), which is received from the pre-crash brake execution determination section (110), and executes the preceding brake control.

3. The vehicle brake system according to claim 2, wherein the braking control section (90) calculates a target flow rate (V_tgt_esc) of the brake fluid on the basis of the target value (P_tgt), which is received from the pre-crash brake execution determination section (110), sends information on the target value (P_tgt_esc) and information on the target flow rate (V_tgt_esc) of the brake fluid to the booster control section (100).

4. The vehicle brake system according to claim 2, wherein the booster control section (100):
stores, as an initial value (P_tgt_0), the target value (P_tgt) at the time when the change amount (ΔP) of the target value (P_tgt), which is received from the pre-crash brake execution determination section (110), exceeds the specified threshold value (ΔP_thr), and stores, as an initial flow rate (V_tgt_0), the target flow rate (V_tgt) of the brake fluid corresponding to the initial value (P_tgt_0); and
terminates the preceding brake control when the target value (P_tgt_esc) received from the braking control section (90) reaches the initial value (P_tgt_0) and the target flow rate (V_tgt) of the brake fluid, which is calculated according to the change amount (ΔP) of the target value (P_tgt) received from the pre-crash brake execution determination section (110), exceeds the initial flow rate (V_tgt_0) by a specified rate or higher.

5. The vehicle brake system according to claim 4, wherein after terminating the preceding brake control, the booster control section (100) initiates the pre-crash brake operation on the basis of the target flow rate (V_tgt_esc) of the brake fluid, which is received from the braking control section (90).

6. The vehicle brake system according to claim 4, wherein the booster control section (100) forcibly terminates the preceding brake control in the case where the preceding brake control is continued even after a maximum time, which is set in advance, elapses from the initiation of the preceding brake control.

7. The vehicle brake system according to claim 4 further comprising:
a brake hydraulic pressure detecting section (24) that detects the brake hydraulic pressure, wherein
the specified target value (P_tgt) for decelerating the vehicle is the target value (P_tgt) of the brake hydraulic pressure generated to the wheel cylinder, and
the booster control section (100) forcibly terminates the preceding brake control in the case where a difference between the target value (P_tgt) of the brake hydraulic pressure received from the pre-crash brake execution determination section (110) and a detection value (P_act) of the brake hydraulic pressure detected by the brake hydraulic pressure detecting section (24) becomes equal to or lower than a threshold value, which is set in advance, during execution of the preceding brake control.

8. The vehicle brake system according to claim 4, wherein the booster control section (100) prohibits the execution of the preceding brake control for a specified period after termination of the preceding brake control.

9. The vehicle brake system according to claim 1, wherein the specified target value (P_tgt) for decelerating the vehicle is the target value (P_tgt) of the brake hydraulic pressure generated to the wheel cylinder or a target value of deceleration of the vehicle.

* * * * *